(12) United States Patent
Eberhard et al.

(10) Patent No.: US 6,212,514 B1
(45) Date of Patent: Apr. 3, 2001

(54) DATA BASE OPTIMIZATION METHOD FOR ESTIMATING QUERY AND TRIGGER PROCEDURE COSTS

(75) Inventors: Rainer Eberhard; Harold H. Hall, Jr.; Jon A. Youngberg, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,292

(22) Filed: Jul. 31, 1998

(51) Int. Cl.[7] .................................................. G06F 17/30

(52) U.S. Cl. .......................... 707/2; 707/3; 707/4

(58) Field of Search ........................................ 707/2, 3, 4

(56) References Cited

U.S. PATENT DOCUMENTS

| | | | |
|---|---|---|---|
| 5,301,317 | 4/1994 | Lohman et al. | 707/2 |
| 5,598,559 | 1/1997 | Chaudhuri | 707/2 |
| 5,734,884 | * 3/1998 | Eberhard et al. | 707/2 |
| 5,758,144 | * 5/1998 | Eberhard et al. | 707/2 |
| 5,950,186 | * 9/1999 | Chaudhuri et al. | 707/2 |
| 6,003,022 | * 12/1999 | Eberhard et al. | 707/2 |
| 6,081,801 | * 6/2000 | Cochrane et al. | 707/3 |

OTHER PUBLICATIONS

IEEE publication, "Estimating Recursive Query Costs for Various Parallel Environments" by Frédéric Andrés et al. pp. 365–372, Jan. 1991.*

Sigmod Record, vol. 20, No. 2, Jun. 1997, pp. 428–439, F. Llirbat et al., "Eliminating Costly Redundant Computations from SQL Trigger Executions".

* cited by examiner

Primary Examiner—Thomas G. Black
Assistant Examiner—Diane D. Mizrahi
(74) Attorney, Agent, or Firm—Ohlandt, Greeley, Ruggiero & Perle, L.L.P.

(57) ABSTRACT

The method of the invention estimates a total processing cost incident to execution of a query statement in respect of a relational database, wherein execution of the query statement results in a further execution of a trigger procedure. The method first estimates the query statement's costs by analyzing components of the query statement to determine a processing time there for in relation to a database table that is the target of the query statement. The method then determines the number of rows that are affected in the database table as a result of execution of the query statement. Next, components of a trigger procedure that is invoked in response to execution of the query statement are analyzed to determine a "base cost" for a single execution of the trigger procedure visa-vis data that is contained in a single row of the database table. The components of the trigger procedure are next analyzed to determine a per row cost for execution of the trigger procedure. The per row cost is determined from an estimate of time required for execution of the trigger procedure for a single row and from an estimate of time required for execution of the trigger procedure for a plurality of rows. Thereafter, the total processing cost of a query statement is calculated by adding the query statement cost to a sum of the either (i) the base cost if only one row is subjected to the query statement or (ii) the per row cost, multiplied by the number of rows affected by the query statement.

18 Claims, 4 Drawing Sheets

DATA BASE OPTIMIZATION METHOD FOR ESTIMATING QUERY AND TRIGGER PROCEDURE COSTS

FIELD OF THE INVENTION

This invention relates to automatic database query methods and, more particularly, to a system and method for estimating costs of database queries, when a trigger procedure is executed.

BACKGROUND OF THE INVENTION

As is well known, database queries are often posed in a non-procedural language such as "Standard Query Language" or SQL. Queries dispatched to relational databases include the following four actions: select, insert, update and delete. Such queries are used to interrogate and modify logical tables, arranged in rows and columns, in the relational databases. A query which is dispatched to a database interrogates a selected table(s) and, depending upon the syntax of the query, returns from none to many rows of the interrogated table(s) which fit the query condition and/or action.

Query optimizer functions are performed by relational database management systems and enable a choice to be made from among a plurality of query strategies so as to arrive at an efficiently executable plan. The computational complexity of the optimization process and the resulting execution efficiency of the plan chosen are dependent upon the number of possible primitive operator sequences that must be evaluated by the optimizer. U.S. Pat. No. 5,301,317 to Lohman et al., assigned to the same Assignee as this application, describes a system for automatic adjustment of resources devoted to query optimization, according to an estimated query execution time. The Lohman et al. system permits a query optimizer to automatically trade off the time spent estimating the execution cost of alternate query execution plans against the potential savings and execution time that one of those alternate plans may yield.

An aspect of query optimization is the resulting execution cost of the query in terms of utilized central processing unit (CPU) time, input/output (I/O) time, and minimum elapsed time that is required by execution of the query statement. An optimizer generally chooses the query plan which results in the least cost to accomplish the execution of the query statement.

U.S. Pat. No. 5,734,884 to Eberhard et al., assigned to the same Assignee as this Application, describes a software tool for estimating the costs of a program which accesses a relational database. The costs may include execution costs of the application or of a transaction, an SQL statement and/or a utility. Execution costs include CPU time, I/O time and minimum elapsed time, wherein minimum elapsed time is an estimation of the amount of time that the application, transaction, SQL or utility will take to execute. The execution costs may also reflect system performance effected by transactional accessing of the database, including batch processing. For estimating the execution costs of a transaction, the software tool generates a simplified transaction definition, including a simplified query statement definition, and a frequency of execution of the query statement in the transaction. The software tool then generates an estimated execution cost based upon the syntax of the simplified query statement and the frequency of execution thereof. The disclosure of both U.S. Pat. Nos. 5,301,317 and 5,734,884 are incorporated herein by reference.

As above indicated, a query statement causes dispatch of a select, insert, update or delete command to one or more tables in a relational database. In response, from 0 to N rows are returned which conform to the condition expressed in the query statement. If the returned data meets the terms of a condition that is associated with the query, a "trigger" procedure is or may be invoked.

A trigger procedure is a responsive program which is automatically executed in response to data, returned (in response to a dispatched query) which meets a condition associated with the trigger procedure. A trigger procedure may be executed in response to each row that is affected by the query or may be executed once for all rows that are affected. A simple example of a query is as follows. Assume that an SQL query statement requires the insertion of an employee name into a specified department that is listed in a database table. Assume further that the user neglects to enter the department number in the SQL query statement. Upon dispatch of the SQL query statement, the database management program causes a trigger procedure to be executed to cause display of a message to the user to enter a department number in the SQL statement.

Trigger procedures can be quite complex and may be dependent upon a number of conditions being met before they execute. Llirbat et al. in "Eliminating Costly Redundant Computations from SQL Trigger Executions", Proceedings of the 1997 ACM Sigmod, Tucson, Ariz. May 13–15, 1997, pp. 428–439, describe a procedure which attempts to eliminate repeated calculations which result from certain types of SQL triggers, to reduce the processing cost thereof. More specifically, Llirbat et al. eliminate redundant computations of SQL triggers when they are costly. Invariant sub-queries are extracted from trigger conditions and actions and the most "profitable" invariants are memorized and utilized in a re-write of the SQL triggers.

As indicated above, a trigger may be caused to execute for each row of a table returned in response to an SQL query statement or may be caused to execute once per SQL query statement, irrespective of the number of rows returned in response to the SQL query statement. It is known, however, that the execution cost of a trigger may not be a linear function based upon the number of rows that are returned. Notwithstanding the potential complexity of estimating trigger costs, there is still a need, during the optimization process, to arrive at an estimate of trigger cost to enable a realistic view of the actual cost of the execution of an SQL query statement and the one or more resulting triggers which occur as a result of the execution thereof.

SUMMARY OF THE INVENTION

The method of the invention estimates a total processing cost incident to execution of a query statement in respect of a relational database, wherein execution of the query statement results in a further execution of a trigger procedure. The method first estimates the query statement's costs by analyzing components of the query statement to determine a processing time there for in relation to a database table that is the target of the query statement. The method then determines the number of rows that are affected in the database table as a result of execution of the query statement. Next, components of a trigger procedure that is invoked in response to execution of the query statement are analyzed to determine a "base cost" for a single execution of the trigger procedure vis-a-vis data that is contained in a single row of the database table. The components of the trigger procedure are next analyzed to determine a per row cost for execution of the trigger procedure. The per row cost is determined from an estimate of time required for execution of the trigger procedure for a single row and from an estimate of time required for execution of the trigger procedure for a plurality of rows. Thereafter, the total processing cost of a query statement is calculated by adding the query statement cost to a sum of the either (i) the base cost if only one row is subjected to the query statement or (ii) the per row cost, multiplied by the number of rows affected by the query statement.

DETAILED DESCRIPTION OF THE INVENTION

Figure 1:
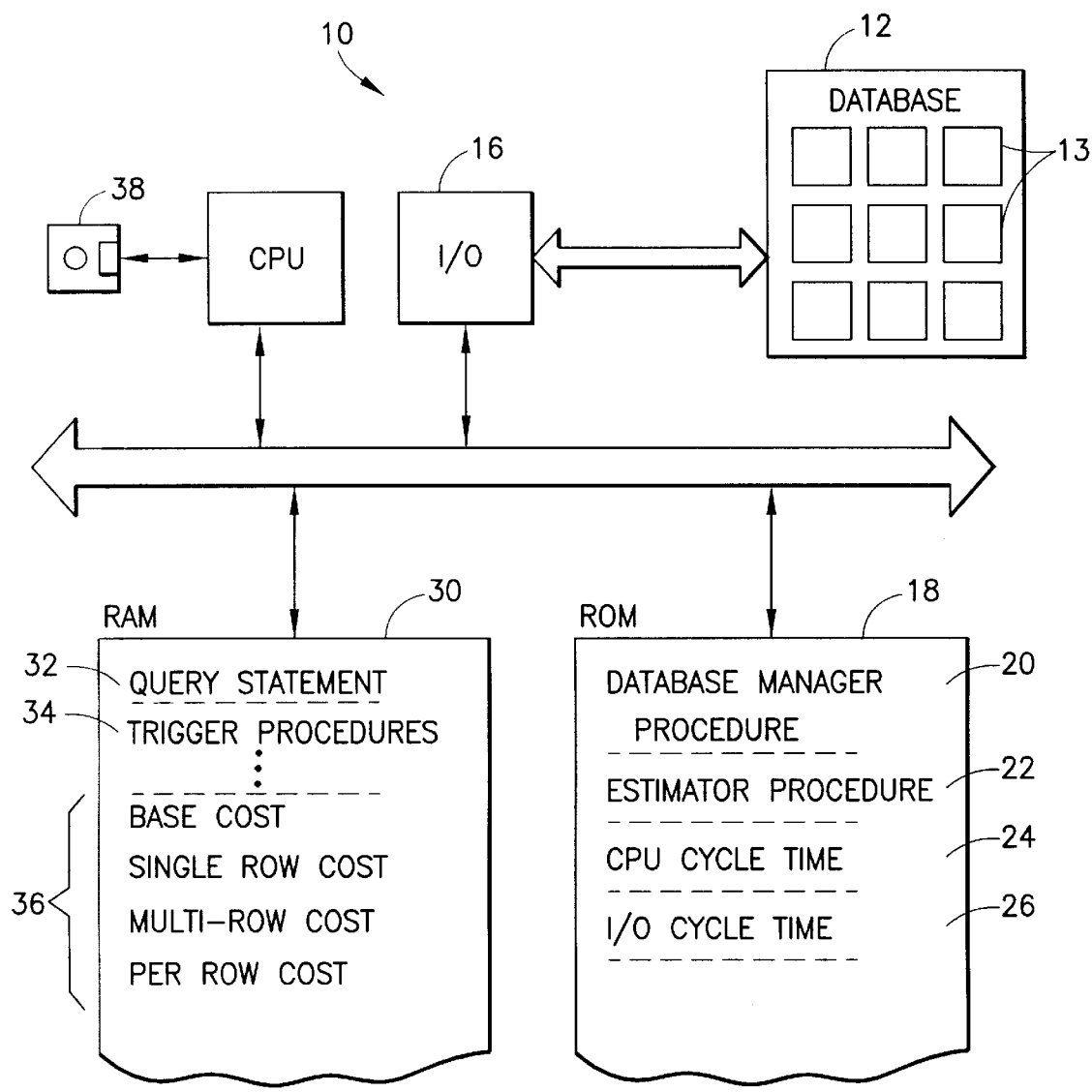
FIG. 1 is a high level block diagram of a system adapted to perform the method of the invention.

Referring to FIG. 1, a computer 10 provides controlling functions for database 12 and enables performance of the standard interface actions with respect thereto, i.e., select, insert, update and/or delete. Data within database 12 are logically arranged in a plurality of tables, each table provided with one or more columns, one or more rows, and being uniquely named.

Computer 10 includes a central processing unit (CPU) 14 and an input/output module 16 which controls data communications with database 12. A read-only memory (ROM) 18 includes various procedures and parameters that may be invoked for control of computer 10 during its interactions with database 12. More particularly, ROM 18 includes a database manager procedure 20 which controls overall interactions between computer 10 and database 12. ROM 18 also includes an estimator procedure 22 which enables a user to derive a cost estimates for execution of both query statements and resulting trigger procedures. ROM 18 also includes various parameters, among which are a CPU cycle time value 24 and an input/output cycle time value 26.

A random access memory (RAM) 30 is utilized to store portions of database manager procedure 20 during execution thereof. Further, RAM 30 stores a query statement 32 whose cost is to be estimated and one or more trigger procedures 34 which may be invoked in response to execution of query statement 32. RAM 30 also includes a region for storing values which are calculated while determining a cost estimate for execution of query statement 32 and triggers 34. Calculated values 36 include a "base" cost, a "single row" cost, a "multiple row" cost, and a "per row" cost. Each of those calculated values will be described below.

Note that while each of the above described procedures will be considered hereafter as already being loaded in the respective memory modules, they can be contained on a memory media disk 38 and loaded into memory as needed (or all at once).

As indicated above, prior to commencing a database data processing action, a user will often undertake to determine the "costs" of various strategies to accomplish such an action in terms of utilized CPU time, I/O time and minimum elapsed time. By accessing the costs of the various strategies, a least-cost strategy can be identified and chosen to accomplish the database action.

Figure 2:
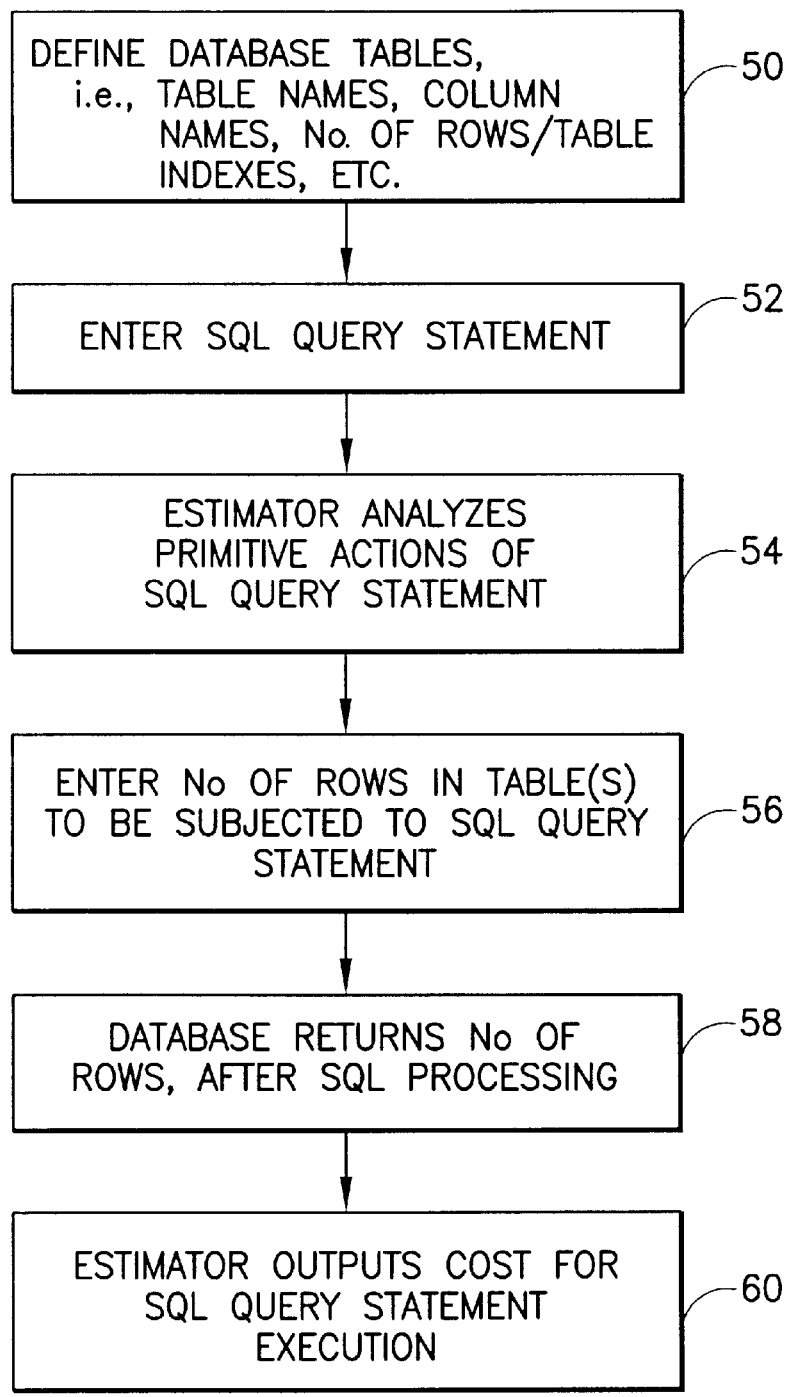
FIG. 2 is a logical flow diagram illustrating a prior art method for determining a cost of execution of an SQL query statement.

FIG. 2 is a logical flow diagram which illustrates a method employed in determining a cost estimate for an SQL query statement to be executed in relation to a database and its included tables. Initially, the tables in the database are defined, i.e., the column names, number of rows per table, indexes, table names, etc. (step 50). Next, an SQL query statement, that is to be used to query the database, is entered (step 52). Thereafter, estimator procedure 22 (FIG. 1) is invoked and analyzes the primitive actions of the components of the SQL query statement to determine the specific actions required thereby (step 54).

Next, the user enters the number of rows in the table or tables that are to be subjected to the SQL query statement (step 56). At this point, database manager procedure 20 processes the SQL query statement in conjunction with database 12 and returns a number of rows that are to be output from database 12 in response to the SQL query statement (step 58). For instance, if the SQL statement requests all employees in an organization having a salary greater than X, database 12 will return the number of rows which include information regarding employees having a salary that is greater than X.

Lastly, estimator procedure 22, based upon the primitives included in the SQL statement and the number of rows returned by database manager 20, calculates and outputs a cost estimate for execution of the SQL query statement (step 60). Note, however, that this procedure does not take into account the execution, if any, of a trigger procedure in response to execution of the SQL query statement. One such trigger procedure might be a requirement that the user enter a coded identifier before access will be enabled view the salary data recovered from the database. While that trigger procedure is very simple, other trigger procedures are more complex and may be executed once per row of retrieved data or once per SQL statement, as the case may be.

Figure 3A:
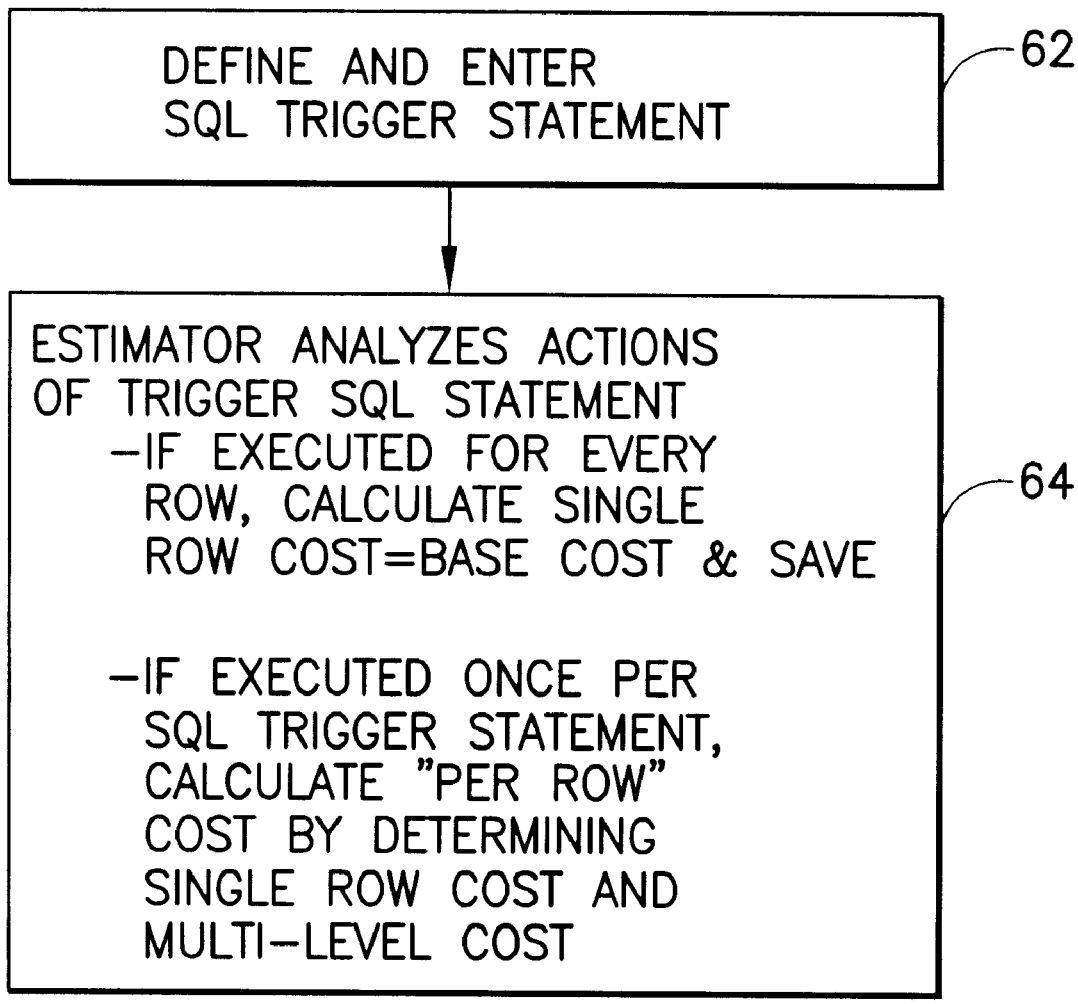
FIGS. 3a and 3b comprise a logical flow diagram illustrating the method of the invention.
Figure 3B:
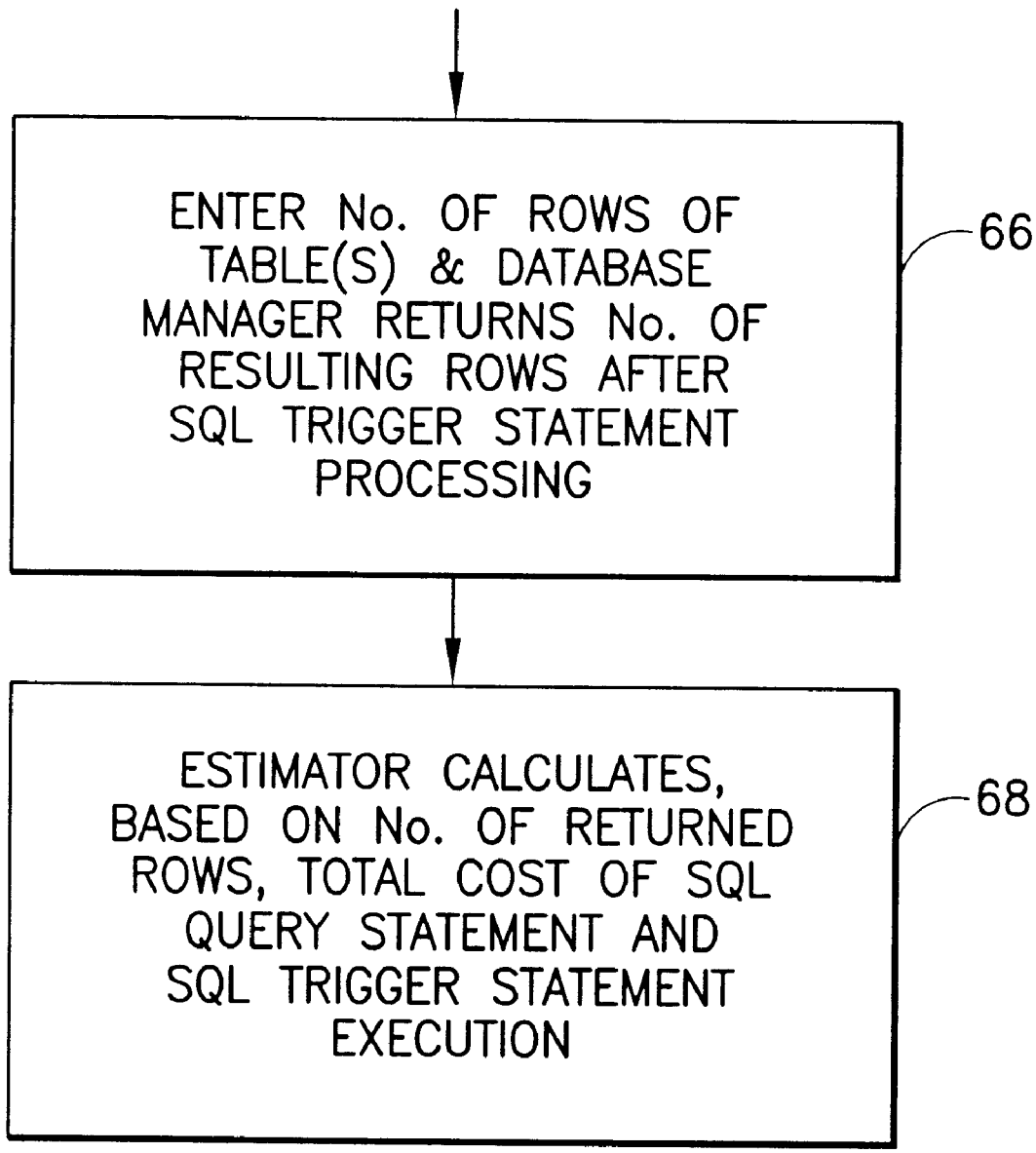

Referring now to FIGS. 3a and 3b, a method for estimating a base and per row cost of a trigger procedure will be described. Hereafter, it is to be understood that a "base" cost for execution of a trigger procedure is the processing cost for execution of the trigger procedure in regards to a single row from a table to be accessed. Further, a "per row" cost will be considered which is the cost of executing the trigger procedure when it is to be executed for more than one row, e.g., once for each of plural rows that are retrieved in response to an SQL query statement. Note that the cost of executing of a trigger procedure for a plurality of rows is often not a linear function of the cost for a single row, but rather is, or may be, a non-linear extrapolation thereof. Accordingly, the derivation of a per row cost, if calculated by a simple multiplication of the number of retrieved rows times the base cost, will often be inaccurate.

Turning now to FIG. 3a, initially the trigger procedure is defined and it is entered in its SQL format (step 62). Thereafter, estimator procedure 22 is called and analyzes the discrete actions of the trigger SQL statement, based upon its included primitives. If the trigger procedure is to be executed for every row, a single row cost for execution of the trigger procedure is calculated as the "base" cost and is saved. Such cost calculation takes into account elapsed CPU time, elapsed input/output time and minimum execution time to accomplish execution of the trigger procedure.

If the trigger procedure is executed once per statement, no matter how many rows are affected, estimator procedure 22 calculates a "per row" cost by determining a cost for execution of the trigger procedure for a single row (which may the base cost or a different value) and the cost for execution of the trigger for multiple rows (e.g., 1000 rows). Thereafter, estimator procedure determines the per row cost by utilization of the two derived parameters, i.e., a single row cost and a multiple row cost. A preferred method is to use a straight line function through the two values. Such a function enables a cost to be extrapolated for any number of returned rows, based upon the slope of the straight line function. The calculated parameters are then saved.

At this point, the user enters a number of rows returned in response to execution of the SQL query statement (determined in step 58 during the processing of the SQL query statement) (step 66). Thereafter, estimator procedure 22 calculates the total cost of execution of the SQL query statement and the resulting trigger procedure, using the precalculated base cost, per row cost and the number of returned rows (step 68). The calculated cost thus takes into account not only the processing cost of the SQL query statement, but also the execution cost of any trigger procedure(s) invoked thereby.

Hereafter, several examples will be provided to further illustrate the method of the invention. Assume first a simple trigger procedure that just requires a base estimated cost per execution.

CREATE TRIGGER "simpleaudit"
    AFTER UPDATE FOR EACH STATEMENT ON employee table
    BEGIN ATOMIC
    INSERT INTO myaudittable "THE USER" userid "UPDATED THE EMPLOYEETABLE AT" current time and date
    END ATOMIC This trigger is entered as part of defining of the EMPLOYEETABLE. At the time it is entered, the table called "myaudittable" already exists. The trigger is executed whenever an UPDATE statement happens against the employee table. It is executed once for each UPDATE, regardless of the number of rows affected by the UPDATE. The method of the invention calculates the costs of executing the INSERT and saves it as the BASE COST for this trigger.

Now assume that the following costs are calculated for the TRIGGER "simpleaudit" and saved:

BASE CPU cost=123
    Per row CPU cost=0
    BASE I/O cost=12
    per row I/O cost=0

A more complex trigger that will have a base estimated cost per execution, as well as an additional cost per row will now be presented.

CREATE TRIGGER completeaudit
    AFTER UPDATE FOR EACH STATEMENT ON employeetable
    REFERENCING OLD_TABLE AS employeesbeforebeingupdated
    REFERENCING NEW_TABLE AS employeesafterbeingupdated
    BEGIN ATOMIC
    INSERT INTO myaudittable "THE USER" userid and "UPDATED THE EMPLOYEE TABLE AT" current time and date
    INSERT INTO completauditbefore SELECT * FROM employeesbeforebeingupdated
    INSERT INTO completeauditafter SELECT * FROM employeesafterbeingupdated
    END ATOMIC As before, this trigger is defined as part of defining the EMPLOYEETABLE. It requires that all three audit tables also be defined.

Whenever an UPDATE statement is executed against the EMPLOYEETABLE, this trigger will also execute. It will write one row to MYAUDITTABLE that says that an update happened. It will also insert a more complete audit trail into the other two tables. The one table will contain a copy of the updated rows before they were updated, and the other table will contain a copy of the updated rows after they were updated.

In calculating the costs for this trigger, the costs need to be calculated for three different inserts. The first insert costs the same as in the simple trigger, i.e., just the base cost, no matter how many rows are updated. The second and third inserts are different. If only one row is updated, then INSERT only one row each, and the cost is about the same as the first statement. But if many rows are updated, then the procedure inserts many rows. So the costs are calculated, assuming that a single row was UPDATED, as follows:

SINGLE ROW COSTS:
    CPU=369
    I/O=36

Then assume that 1,000 rows are updated and calculate a cost as follows:

Costs if 1,000 rows are updated:
    CPU=6363
    I/O=251.8

By calculation, the base and per row costs are estimated and are saved as:

BASE CPU cost=363
    Per row CPU cost=6
    BASE I/O cost=35.8
    per row I/O cost=
    0.216

Next a trigger will be described wherein a base and a per row cost are calculated for a trigger by calculating the costs, assuming a single row, and also calculating the costs assuming some large number of rows (in this case 1,000). Consider the costs of the following UPDATE to the EMPLOYEE table.

UPDATE employeetable SET SALARY=SALARY *1.5 WHERE DEPT=W19

This statement provides everyone in dept W19 with a salary increase. In the prior art, before the costs of this SQL statement could be calculated, the user needed to answer a question regarding how many rows were being updated. The question was posed as follows:

"There are 100,000 rows in the EMPLOYEETABLE table. After processing the predicate DEPT=W19, how many are left?"

Assume the user specified 20 rows.

The cost of updating those 20 rows would be calculated. The cost include a fixed amount for an UPDATE, a certain amount for each row, each column, etc. Further assume that to UPDATE those 20 rows costs 10 CPU cycles and 10 I/O cycles, calculated using the method of FIG. 2.

Now with the two triggers defined above, the costs will be higher. For the first trigger, it has just base costs and no per row cost, so add an additional 123 CPU and 12 I/O for that trigger. For the second trigger, add a base cost of 363 CPU and 35.8 I/O, but also the per row cost multiplied by the 20 rows that were updated. This gives an additional:

$$6*20=120 \text{ CPU and } 0.216*20=5.2 \text{ I/O}.$$

This makes the total costs for the second trigger 363+120=483 CPU and 35.8+5.2=41 I/O Now the total costs for this update are:
CPU
10=Cost for the UPDATE
123=Cost for the simple trigger
483=Cost for the complex trigger
I/O
10=Cost for the UPDATE
12=Cost for the simple trigger
41=Cost for the complex trigger So the answer as to an estimated cost for the update of 20 rows, taking into account the update and the two triggers, is simply:
CPU=616
I/O=63

The above examples do not require the user to ask how many rows were processed during trigger processing.

If a trigger is considered that is complex enough that the user needs to input the number of rows processed (in the manner required for the original SQL query statement), then instead of asking for a single number, the user is asked for two numbers, the first assuming a single row that caused the trigger to fire, and the second assuming that 1,000 rows caused the trigger to fire. The function connecting the two values is then used to enable a cost calculation for the specified number of returned rows.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for estimating a total processing cost for executing a query statement with respect to a relational database, wherein execution of said query statement results in a further execution of a trigger procedure, said method comprising the steps of:
    estimating a query cost of said query statement in relation to a database table that is a target of said query statement;
    determining a number of rows that are affected in said database table as a result of execution of said query statement;
    analyzing components of a trigger procedure that is invoked in response to execution of said query statement to determine a base cost for a single execution of said trigger procedure in relation to data contained in a single row of said database table;
    further analyzing components of said trigger procedure to determine a per row cost for execution of said trigger procedure; and
    calculating said total processing cost by adding said query cost to a sum of said base cost, plus said per row cost multiplied by the number of rows affected by said query statement, as determined by said determining step.

2. The method as recited in claim 1, wherein said estimating of a query cost of said query statement is performed by analyzing components of said query statement to determine, at least, a processing time there for.

3. The method as recited in claim 2, wherein said per row cost is determined from an estimate of time required for execution of said trigger procedure for a single row of said database table and from an estimate of time required for execution of said trigger procedure for a plurality of rows of said database table.

4. The method as recited in claim 3, wherein said base cost includes both central processing time and input/output processing time.

5. The method as recited in claim 1, wherein said per row cost is determined from a function relating said estimate of time required for execution of said trigger procedure for a single row of said database table and said estimate of time required for execution of said trigger procedure for a plurality of rows of said database table.

6. The method as recited in claim 5, wherein said function is a straight line connecting said estimate for a single row and said estimate for said plurality of rows.

7. A memory media for controlling a computer to estimate a total processing cost to execute a query statement with respect to a relational database, wherein execution of said query statement results in a further execution of a trigger procedure, said memory media comprising:
    a) means for controlling said computer to estimate a query cost of a query statement in relation to a database table that is a target of said query statement;
    b) means for controlling said computer to determine a number of rows that are affected in said database table, as a result of execution of said query statement;
    c) means for controlling said computer to analyze components of a trigger procedure that are invoked in response to execution of said query statement to determine a base cost for a single execution of said trigger procedure in relation to data contained in a single row of said database table;
    d) means for controlling said computer to further analyze components of said trigger procedure to determine a per row cost for execution of said trigger procedure; and
    e) means for controlling said computer to calculate said total processing cost by adding said query cost to a sum of said base cost plus said per row cost multiplied by the number of rows affected by execution of said query statement, as determined by said determining step.

8. The memory media as recited in claim 7, wherein said means a) estimates a query cost of said query statement by analyzing components of said query statement to determine, at least, a processing time there for.

9. The memory media as recited in claim 8, wherein said means d) determines said per row cost from an estimate of time required for execution of said trigger procedure for a single row of said database table and from an estimate of time required for execution of said trigger procedure for a plurality of rows of said database table.

10. The memory media as recited in claim 9, wherein said base cost includes both central processing time and input/output processing time.

11. The memory media as recited in claim 7, wherein said per row cost is determined from a function relating said estimate of time required for execution of said trigger procedure for a single row of said database table and said estimate of time required for execution of said trigger procedure for a plurality of rows of said database table.

12. The memory media as recited in claim 11, wherein said function is a straight line connecting said estimate for a single row and said estimate for said plurality of rows.

13. A system for estimating a total processing cost for executing a query statement with respect to a relational database, wherein execution of said query statement results in a further execution of a trigger procedure, said system comprising:
    a relational database including data organized into logical tables;

memory means for storing an estimator procedure for controlling a processor to estimate said total processing cost of a query statement and said trigger procedure; and a processor, which, in combination with said estimator procedure:
  estimates a query cost of said query statement in relation to a database table that is a target of said query statement;
  determines a number of rows that are affected in said database table as a result of execution of said query statement;
  analyzes components of a trigger procedure that is invoked in response to execution of said query statement to determine a base cost for a single execution of said trigger procedure in relation to data contained in a single row of said database table;
  further analyzes components of said trigger procedure to determine a per row cost for execution of said trigger procedure; and
  calculates said total processing cost by adding said query cost to a sum of said base cost, plus said per row cost multiplied by the number of rows affected by said query statement.

14. The system as recited in claim 13, wherein said estimate of a query cost of said query statement is performed by analyzing components of said query statement to determine, at least, a processing time there for.

15. The system as recited in claim 14, wherein said per row cost is determined from an estimate of time required for execution of said trigger procedure for a single row of said database table and from an estimate of time required for execution of said trigger procedure for a plurality of rows of said database table.

16. The system as recited in claim 15, wherein said base cost includes both central processing time and input/output processing time.

17. The system as recited in claim 13, wherein said per row cost is determined from a function relating said estimate of time required for execution of said trigger procedure for a single row of said database table and said estimate of time required for execution of said trigger procedure for a plurality of rows of said database table.

18. The system as recited in claim 17, wherein said function is a straight line connecting said estimate for a single row and said estimate for said plurality of rows.

* * * * *